US012613794B2

(12) United States Patent
Chen et al.

(10) Patent No.: US 12,613,794 B2
(45) Date of Patent: Apr. 28, 2026

(54) CURIOSITY-DRIVEN ANDROID APP AUTOMATIC TESTING METHOD

(71) Applicant: FUZHOU UNIVERSITY, Fuzhou (CN)

(72) Inventors: Xing Chen, Fuzhou (CN); Yingren Chen, Fuzhou (CN); Rirong Song, Fuzhou (CN)

(73) Assignee: FUZHOU UNIVERSITY, Fuzhou (CN)

( * ) Notice: Subject to any disclaimer, the term of this patent is extended or adjusted under 35 U.S.C. 154(b) by 270 days.

(21) Appl. No.: 18/533,187

(22) Filed: Dec. 8, 2023

(65) Prior Publication Data

US 2024/0345942 A1 Oct. 17, 2024

Related U.S. Application Data

(63) Continuation of application No. PCT/CN2023/097418, filed on May 31, 2023.

(30) Foreign Application Priority Data

Apr. 4, 2023 (CN) .......................... 202310352754.2

(51) Int. Cl.
$G06F\ 11/36$ (2025.01)
$G06F\ 11/3668$ (2025.01)
$G06F\ 11/3698$ (2025.01)

(52) U.S. Cl.
CPC ...... G06F 11/3688 (2013.01); G06F 11/3698 (2025.01)

(58) Field of Classification Search
CPC ............. G06F 11/3668; G06F 11/3688; G06F 11/3698; G06N 20/00; G06N 3/006; G06N 7/01
See application file for complete search history.

(56) References Cited

FOREIGN PATENT DOCUMENTS

| CN | 111931943 A | 11/2020 |
| CN | 114721397 A | 7/2022 |
| WO | 2022258740 A1 | 12/2022 |

OTHER PUBLICATIONS

Zhaoxu Zhang et al., "Automatically Reproducing Android Bug Reports Using Natural Language Processing and Reinforcement Learning," 2023, arXiv, pp. 1-11. Retrieved from the Internet: <URL: https://arxiv.org/pdf/2301.07775>. (Year: 2023).*

(Continued)

*Primary Examiner* — Hanh Thi-Minh Bui
(74) *Attorney, Agent, or Firm* — Bayramoglu Law Offices LLC

(57) ABSTRACT

A curiosity-driven Android app automatic testing method includes the following steps:1) a left part represents a pre-processing assembly which achieves abstraction of an Android app state based on an Android interface structure; 2) a right part is curiosity-driven reinforcement learning module which maintains a historical access state set and optimizes an exploration policy constantly to guide a test to find more new states under the guidance of a reward function based on a curiosity thought; and 3) a middle part represents an advanced guidance module of a deterministic finite automaton (DFA), where the DFA is constructed during operation to record all access states and frequencies thereof; and if the new states are not explored within a given time budget, an AndroidExplore selects the most curious state as a starting point of a next exploration according to global information of the DFA.

6 Claims, 4 Drawing Sheets

(56) References Cited

OTHER PUBLICATIONS

Yan Zheng, et al., Automatic Web Testing Using Curiosity-Driven Reinforcement Learning, 2021 IEEE/ACM 43rd International Conference on Software Engineering (ICSE), 2021, pp. 423-435.
Minxue Pan, et al., Reinforcement Learning Based Curiosity-Driven Testing of Android Applications, ISSTA, 2020, pp. 153-164.

* cited by examiner

CURIOSITY-DRIVEN ANDROID APP AUTOMATIC TESTING METHOD

CROSS REFERENCE TO THE RELATED APPLICATIONS

This application is the continuation application of International Application No. PCT/CN2023/097418, filed on May 31, 2023, which is based upon and claims priority to Chinese Patent Application No. 202310352754.2, filed on Apr. 4, 2023, the entire contents of which are incorporated herein by reference.

TECHNICAL FIELD

The present invention relates to the technical field of Android app automatic testing, and particularly relates to a curiosity-driven Android app automatic testing method.

BACKGROUND

With popularization of mobile equipment, the number of apps is in explosive growth, with dependency thereon on the rise in daily life. Data reveal that every use spends more than two hours in mobile apps every day, and therefore, to guarantee the correctness of the apps appears to be particularly important. Generally speaking, high quality testing is an important way to guarantee the correctness of the apps. However, it is still a challenge to test an Android app because (1) one app may include many complicated service functions and the service functions may usually contain a lot of interfaces and executable events, which results in a huge assembly space of possible events and conversions; (2) the app also has the function of being accessed under specific conditions; and (3) the Android app based on mobile equipment as a carrier also stores specific system-level events (for example, volume increase or decreases, and the like).

SUMMARY

In view of this, an object of the present invention is to provide a curiosity-driven Android app automatic testing method, to achieve a higher code coverage rate, a greater fault exposure number, and a higher testing efficiency.

In order to achieve the above object, the present invention provides the following technical solution: a curiosity-driven Android app automatic testing method, including the following steps:

1) a left part representing a pre-processing assembly for achieving abstraction of an Android app state based on an Android interface structure, wherein the pre-processing assembly extracts the Android interface structure using an automatic framework UIautomator, maps the Android interface structure into an Android app state, and extracts an executable event set;

2) a right part being a curiosity-driven reinforcement learning module for maintaining a historical access state set and optimizing an exploration policy constantly to guide a test to find more new states under the guidance of a reward function based on a curiosity thought; and 3) a middle part representing an advanced guidance module of a deterministic finite automaton (DFA), wherein the DFA is constructed during operation of the advanced guidance module of the DFA to record all access states and frequencies thereof; and if the new states are not explored within a given time budget, an AndroidExplore selects the most curious state as a starting point of a next exploration according to global information of the DFA, so as to prevent from falling into a local optimum and improve an exploration probability of a deep function.

In a preferred embodiment, an Android app under test (AUT), a testing time, the maximum step number of an action sequence and a similarity threshold are taken as inputs; then, the Android AUT is constantly explored within a given testing time, the maximum step number of the action sequence is set, and when the step number is the maximum, the AUT is rebooted to start a new round of test; after the test is started, the AndroidExplore maintains a state set M to store an explored state and is hereby guided to explore some different states, i.e., curious states; a pre-processing module abstracts an initial Android app state $s_t$ and an executable action set $A_t$ from the AUT; each round of test is started in an initial state $s_t$, an action $a_t$ is selected and executed according to a policy, and the AUT responds to the action and converts the action into another state; if the AUT is converted into a fault state, an current action sequence is added into a fault case set, and this round of test is finished; otherwise, the pre-processing module abstracts a next state $s_{t+1}$ and an action set $A_{t+1}$; and if within the given time budget, the AndroidExplore has not explored the new states, the DFA constructed during operation provides advanced guidance, selects the most curious state as the starting point of the next exploration, and updates the action sequence; and when the state $s_{t+1}$ is reached, the AndroidExplore compares the state $s_{t+1}$ with the explored state in a historical state set M according to an Android app state similarity calculation method, and calculates a reward $r_t$ according to similarity values thereof and updates the state set M; then, the AndroidExplore trains a policy $\pi$ according to conversion information $(s_t, a_t, s_{t+1})$ and $r_t$; in addition, during operation, the DFA is dynamically constructed according to the conversion information $(s_t, a_t, s_{t+1})$ during operation, and an access number of times of each conversion is updated; and finally, after the test is finished, the AUT is analyzed to generate a code coverage rate of this exploration.

In a preferred embodiment, an interface structure of a current Android app is analyzed using the automatic framework UIAutomator to acquire Activity and information of various view components, so as to abstract the Android app state $s_t=(act, e_1, e_2, \ldots, e_n)$, wherein act represents the Activity of a current Android App interface, $e_i=\{path_i, classname_i, x_i, y_i, width_i, height_i\}$ represents the view components in the interface, the view components being arranged in a tree structure, wherein $path_i$ represents a path of an element $e_i$ in the Android interface structure, $classname_i$ represents a class name of $e_i$, $x_i$ represents a horizontal ordinate of $e_i$ in the interface, $y_i$ represents a longitudinal ordinate of $e_i$ in the interface, $width_i$ represents a width of $e_i$ in the interface, and $height_i$ represents a height of $e_i$ in the interface; and Pre-processing takes the AUT as an input and outputs the current state $s_t$ and the action set $A_t$; during the test, the AndroidExplore maintains one state set M to store an accessed state; first, the Pre-processing acquires the current Android interface structure using the automatic framework UIAutomator, analyzes the Activity and the information of various view controls comprised in the current Android interface structure, and generates the state $s_t$ according to the information; then, the Pre-processing traverses and analyzes attributes (e.g., clickable, scrollable) of each view control to infer and generate the executable action set; in addition, a system-level event of mobile equipment is added into the action set to expose more app faults; and finally, the current state is compared with the accessed states by adopting an Android app state similarity calculation method, and if the similarity is greater than a set threshold, the states are merged, and otherwise, the state is returned in form of a new state $s_r$.

In a preferred embodiment, in the Android app test, a target is to learn an effective exploration policy to generate high quality test cases; and the test cases are executed to explore different behaviors of the App, so that the probability that faults hidden in the app are found is further improved, and it is needed to further define an effective reward function.

In a preferred embodiment, an Android app state similarity calculation method is proposed and integrated into design of the reward function based on the curiosity thought, so as to hereby guide the Android app test to advance toward a direction of finding more different states.

In a preferred embodiment, two Android app states $RT_k$ and $RT_j$ are given; first, whether the Activities where the two Android app states belong are same is judged, if not, the two Android app states may focus on different functional scenarios, and the two Android app states are regarded as different states; otherwise, an interface similarity of the two Android app states are further calculated based on interface structure information, as shown in equation 1, and if the interface similarity is greater than a predefined threshold, the two Android app states are regarded as the same states;

$$sim(RT_k, RT_j) = \frac{\sum_{l=1}^{N}\sum_{q=1}^{M_l}\sum_{r=1}^{M_j}equalE(e_{k,l,q}, e_{j,l,r})}{\max(N(RT_k), N(RT_j))}, \qquad (1)$$

wherein $l$ represents the number of layers where the element is located, $e_{k,l,q}$ represents the $q^{th}$ element in the $l^{th}$ layer in $RT_k$, and $e_{j,l,r}$ represents the $r^{th}$ element of a node in the lth layer in $RT_j$; a function equalE( ) is used to judge whether the two elements are same; the number of same elements between $RT_k$ and $RT_j$ are calculated layer by layer, the $l^{th}$ layer of $RT_j$ is traversed to judge whether an $e_{j,l,r}$ is the same as an element $e_{k,l,q}$ in $RT_k$, if yes, equalE($e_{k,l,q}$, $e_{j,l,r}$)=1, indicating that there is the element same with $e_{j,l,r}$ in $RT_j$; then, the number of the same elements between $RT_k$ and $RT_j$ is divided by a greater value of the numbers of the elements to obtain the similarity between $RT_k$ and $RT_j$; and when the similarity is greater than the threshold, it is regarded that two interface states are same;

in a process of comparing the similarities of the interface states, it is needed to judge whether the two elements are same, with a judging rule as follows: first, whether the positions path and class names classname of the two elements in the interface structure are same is judged; then, whether appearances of the two elements are similar are judged, and the similarity calculation method is shown in an equation 2; and moreover, only when the positions and class names of the two elements are same in attribute and similar in appearance, the two elements are same;

$$sim(e_{k,l,q}, e_{j,l,r}) = \frac{\min(e_{k,l,q}.x, e_{j,l,r}.x)}{\max(e_{k,l,q}.x, e_{j,l,r}.x)} * p_1 + \frac{\min(e_{k,l,q}.y, e_{j,l,r}.y)}{\max(e_{k,l,q}.y, e_{j,l,r}.y)} * p_2 + \qquad (2)$$

$$\frac{\min(e_{k,l,q}.width, e_{j,l,r}.width)}{\max(e_{k,l,q}.width, e_{j,l,r}.width)} * p_3 + \frac{\min(e_{k,l,q}.height, e_{j,l,r}.height)}{\max(e_{k,l,q}.height, e_{j,l,r}.height)} * p_4,$$

wherein the equation 2 represents the similarity calculation method of the appearances of the elements, and is a weighted sum of four parts; the four parts are respectively levels of similarity of horizontal ordinates, longitudinal ordinates, widths, and heights of the elements $e_{k,l,q}$ and $e_{j,l,r}$; $p_i$ is weights thereof; and when the similarity sim is greater than the threshold, it is regarded that the two elements are same.

In a preferred embodiment, during test, the AndroidExplore maintains a state set M to record reached states; when a state $s_t$ is reached, if the Activity of the state $s_t$ is different from the Activity of all the accessed states or $s_t$ is a fault state, it is regarded that the state is a brand new state, and a big reward of 100 is given; otherwise, the reward is given according to the state $s_t$ and the maximum similarity of the accessed states in the set M, wherein a basic thought thereof lies in that the higher the similarity value is, the smaller the acquired reward is; when the similarity is greater than the set threshold, it is regarded that the state $s_t$ has been accessed with a lower exploration value, and a reward of −100 is given; and a curiosity-driven record function is shown in an equation 3;

$$R(s_t) = \begin{cases} 100 & g(s_t) \notin g(M) \text{ or crash} \\ 100 \cdot (1 - h(s_t)) & g(s_t) \in g(M) \text{ and } h(s_t) \leq 0.9 \\ -100 & g(s_t) \in g(M) \text{ and } h(s_t) > 0.9 \end{cases} \qquad (3)$$

wherein $s_t$ is the current state, M is the historical state set, a g(s) function represents the Activity of the state s, crash represents an app breakdown state, and $$h(s) = \max_{\substack{t \in M \\ g(t)=g(s)}} sim(s, t)$$

is the maximum similarity of the state s and the accessed state in the set M.

In a preferred embodiment, the AndroidExplore synchronously optimizes the exploration policy of reinforcement learning in an Android app testing process based on the curiosity-driven reward function, with a specific optimization process as follows:

first, Q-learning maintains a Q function, and the Q function returns a corresponding Q value for any state-action pair; as the states and actions all are discrete in the Android app test, the Q function can represent the Q values of the state-action pairs in form of tables;

then, in each discrete time step t, the Android app executes an action $a_t$ in a state $s_t$ and converts the state into a state $s_{t+1}$; and a reward value $r_t$ of the action $a_t$ is calculated using the curiosity-driven reward function according to conversion information ($s_t$, $a_t$, $s_{t+1}$); and finally, the AndroidExplore calculates the acquired reward value $r_t$ according to the conversion information ($s_t$, $a_t$, $s_{t+1}$) and the reward function, and updates the Q function using an equation 4, so as to train the exploration policy $\pi$ of reinforcement learning;

$$Q(s_t, a_t) \leftarrow Q(s_t, a_t) + \alpha(r_t + \gamma Q^*(s_{t+1}, a_{t+1}) - Q(s_t, a_t)); \qquad (4)$$

in the Android app test, the reinforcement learning is constantly interacted with the Android app based on the exploration policy, so as to implement an automatic test of the Android app; specifically speaking, when the Android app reaches the state $s_{t+1}$, based on the Q function of Q-learning, the reinforcement learning selects a next valid action $a_{t+1}$ in the state $s_{t+1}$ using a greedy policy of $\epsilon$-greedy, and a selection policy of a specific action is shown in an equation 5, wherein the specific meaning of the equation 5 is as follows: the reinforcement learning selects the action with the maximum Q value with the probability of $1-\epsilon$ according to the Q function, and randomly selects a user interface (UI) event or a system-level event of the mobile equipment in the state $s_{t+1}$ with the probability of $\epsilon/2$;

$$getAction(s) = \begin{cases} \underset{a}{argmax} Q(s,a) & 1-\varepsilon \\ \text{Randomly select an } UI \text{ event} & \frac{1}{2}\varepsilon \\ \text{Randomly select a system event of the mobile equipment} & \frac{1}{2}\varepsilon \end{cases}$$ (5)

In a preferred embodiment, the AndroidExplore dynamically and incrementally constructs an DFA during the Android app test; the AndroidExplore dynamically constructs an DFA according to the conversion $(s_t, a_t, s_{t+1})$ during the test first; and during the test, if there are no new states found within the given time budget, a conversion with the highest curiosity is selected from the DFA based on the curiosity thought;

during the Android app test, the AndroidExplore records the number of times of each conversion, defined as N(s, a, s'); one conversion $(s_t, a_t, s_{t+1})$ is executed, so the DFA and N(s, a, s') will also be updated, i.e., $\delta=\delta\cup\{((s_t, a_t, s_{t+1})\}$ and $N(s_t, a_t, s_{t+1})=N(s_t, a_t, s_{t+1})+1$; and during the test, if an RL has not found the state within the given time budget, the RL selects a conversion with the highest curiosity from the DFA based on the curiosity thought; and by taking the DFA constructed during operation and a set N(s, a, s') recording the number of conversions of the state as inputs, a path capable of reaching the conversion with the highest curiosity is outputted; first, a state conversion $(s_k, a_k, s_{k+1})$ with the least executing number of times is selected according to the set N(s, a, s'); then, the DFA is traversed according to a shortest path algorithm to seek for a shortest path tr capable of reaching the conversion; and finally, the shortest path tr is returned.

Compared with the prior art, the present invention has the following beneficial effects: the present invention can provide double-layered guidance for testing quality and efficiency; on the one hand, a high quality action sequence (test cases) which satisfies a time sequence relationship is generated adopting curiosity-driven reinforcement learning, where the reward function integrates an Android app state similarity calculation method, which provides low-level guidance for the exploration process; and on the other hand, to avoid from falling into a local optimum and find deep faults, a DFA is incrementally constructed during operation, which provides high-level guidance for improving the testing efficiency and quality. The present invention is comprehensively evaluated in 20 real Android apps. Experimental results show that compared with existing Android automatic testing technologies, the present invention, in most cases, can achieve a higher code coverage rate, a greater fault exposure number, and a higher testing efficiency.

DETAILED DESCRIPTION OF THE EMBODIMENTS

Further description of the present invention will be made below in combination with drawings and embodiments.

It is to be noted that the detailed description below is exemplary and is intended to further describe the application. Unless specified otherwise, all technical and scientific terms used herein have the same meaning as commonly understood by those of ordinary skill in the art to which the application belongs.

It is to be noted that the terms used herein are merely used for describing specific embodiments, and are not intended to limit the exemplary embodiments according to the present application; as used herein, unless otherwise specified in the context, the singular form is further intended to include plural form. In addition, it is to be further understood that when the terms "comprise" and/or "include" are used in the description, it indicates that there are features, steps, operations, apparatuses, assemblies and/or their combinations.

Figure 1:
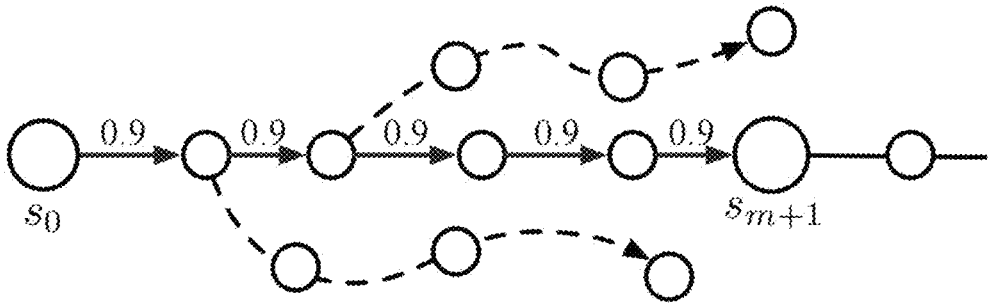
FIG. 1 is an illustrative schematic diagram of a conversion of a target state under a long action sequence in a preferred embodiment of the present invention.
Figure 2:
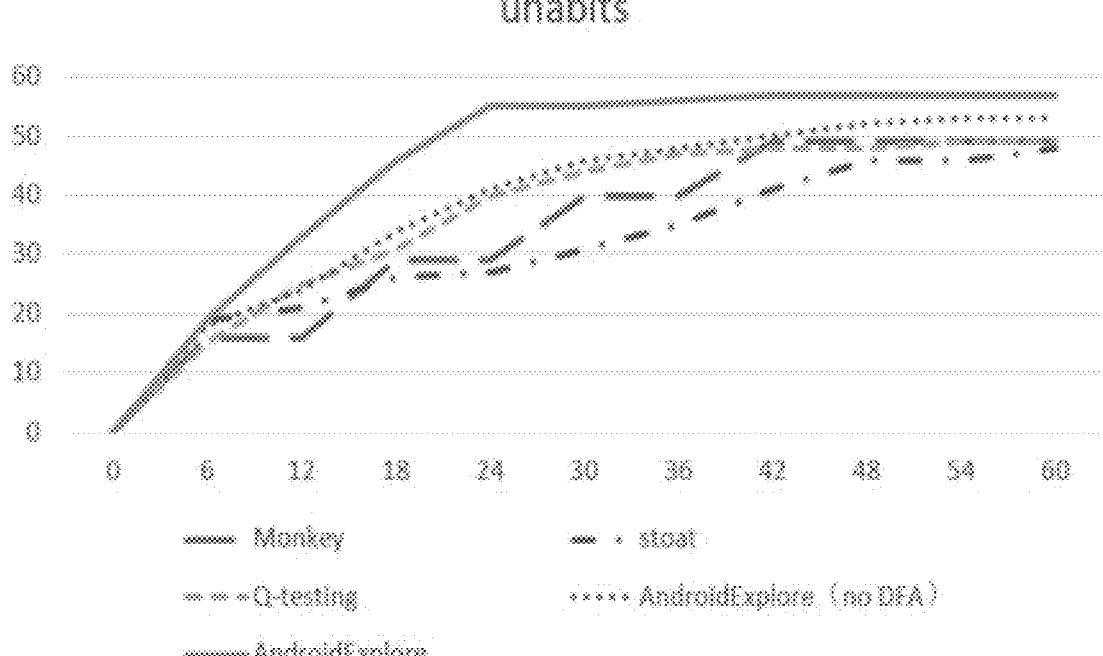
FIG. 2 is a growth curve diagram of a code coverage rate about uhabits in the preferred embodiment of the present invention.
Figure 3:
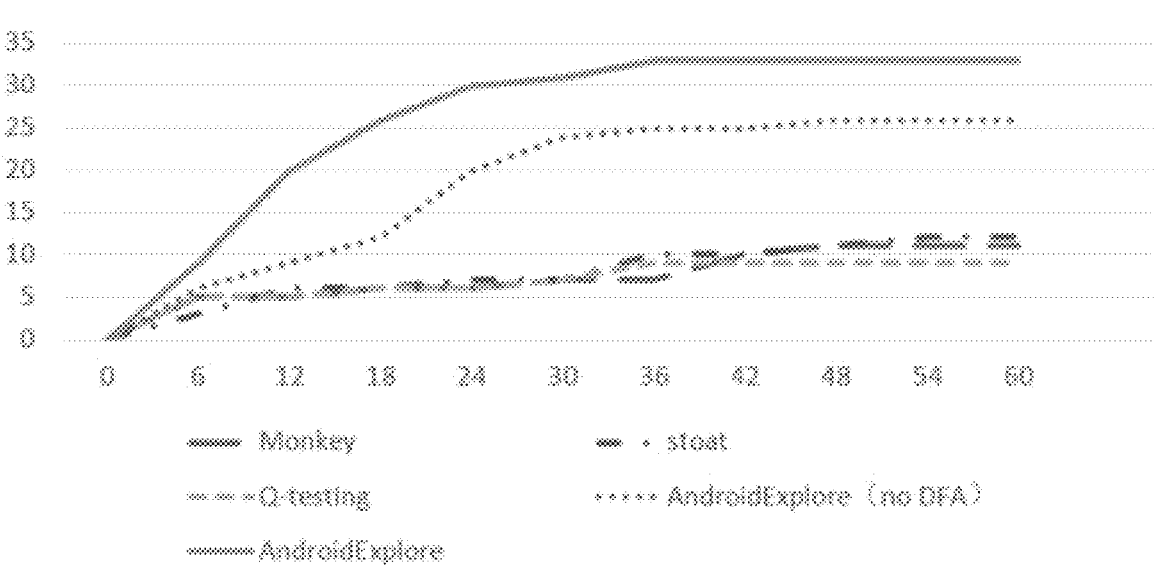
FIG. 3 is a growth curve diagram of a code coverage rate about keepassdroid in the preferred embodiment of the present invention.
Figure 4:
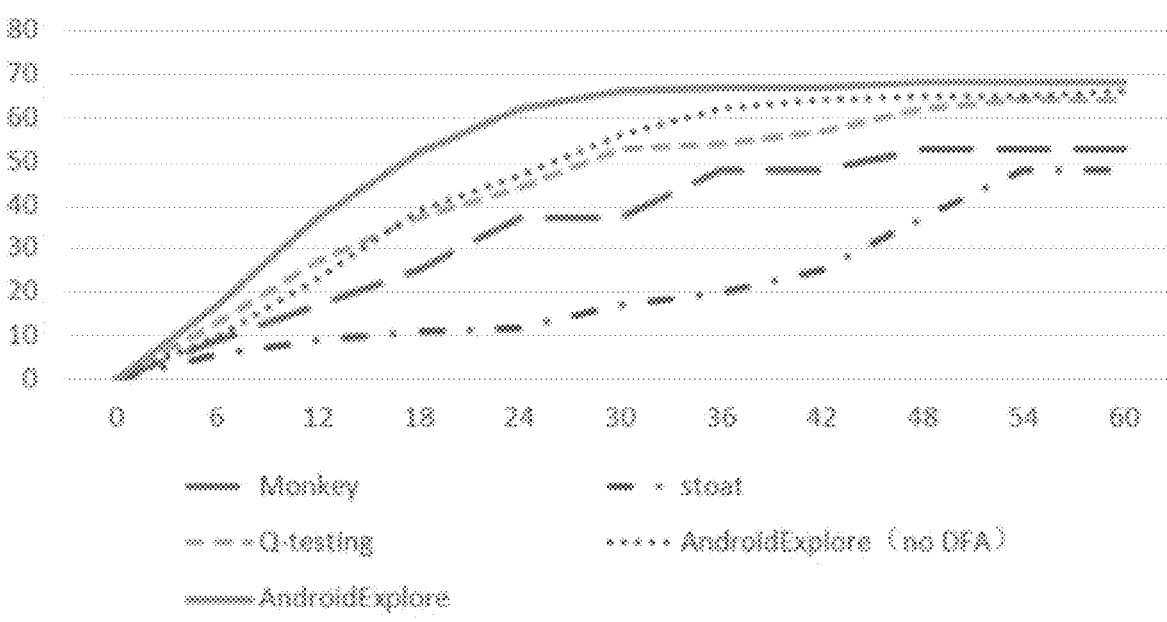
FIG. 4 is a growth curve diagram of a code coverage rate about weather in the preferred embodiment of the present invention.
Figure 5:
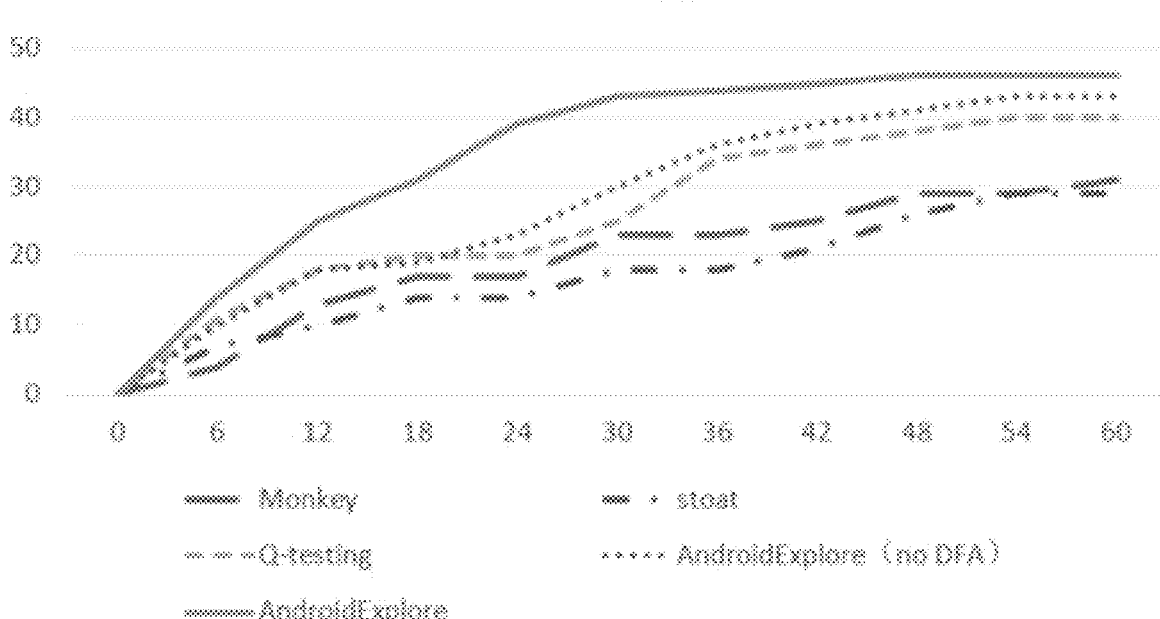
FIG. 5 is a growth curve diagram of a code coverage rate about multismssender in the preferred embodiment of the present invention.
Figure 6:
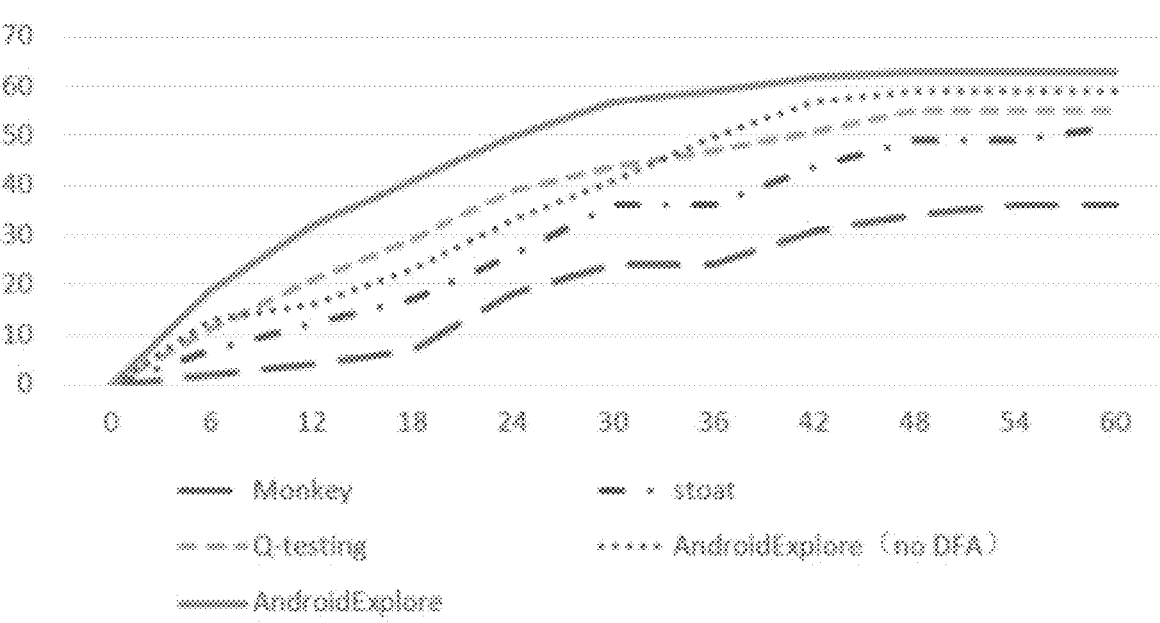
FIG. 6 is a growth curve diagram of a code coverage rate about anycut in the preferred embodiment of the present invention.
Figure 7:
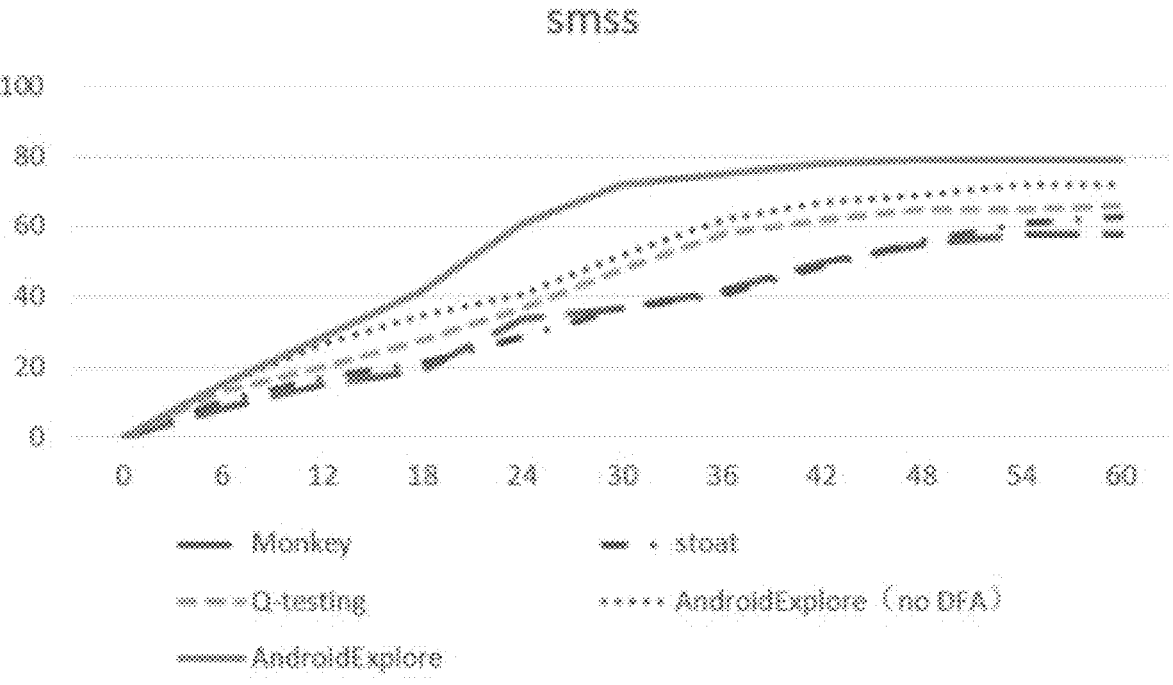
FIG. 7 is a growth curve diagram of a code coverage rate about smss in the preferred embodiment of the present invention.

Referring to FIG. 1 to FIG. 2, the present invention proposes an Android app-oriented automatic testing framework AndroidExplore based on a curiosity thought. Its goal is to achieve Android app automatic testing by automatically generating a high quality action sequence. To achieve this goal, the AndroidExplore provides double-layered guidance: on the one hand, a high quality action sequence which satisfies a time sequence relationship is generated adopting curiosity-driven reinforcement learning, where the reward function integrates an Android app state similarity calculation method, which provides low-level guidance for the exploration process; and on the other hand, a DFA is incrementally constructed during operation of the AndroidExplore, which provides high-level guidance for improving the testing efficiency and quality. A method framework is exhibited, which can be divided into three parts: 1) a left part representing a pre-processing assembly for achieving abstraction of an Android app state based on an Android interface structure. Specifically speaking, the pre-processing assembly extracts the Android interface structure using an automatic framework (UIautomator, maps the Android interface structure into an Android app state, and extracts an executable event set. 2) a right part being a curiosity-driven reinforcement learning module for maintaining a historical access state set and optimizing an exploration policy constantly to guide a test to find more new states under the guidance of a reward function based on a curiosity thought. 3) a middle part representing an advanced guidance module of a deterministic finite automaton (DFA), wherein the DFA is constructed during operation of the advanced guidance module of the DFA to record all access states and frequencies thereof; and if the new states are not explored within a given time budget, an AndroidExplore selects the most curious state as a starting point of a next exploration according to global information of the DFA, so as to prevent from falling into a local optimum and improve an exploration probability of a deep function.

An algorithm 1 shows details of the method, which takes the Android app under test (AUT), the testing time, the maximum step number of the action sequence, and the similarity threshold as inputs. Then within a given testing time, the AUT (the first line) is continuously explored. To avoid from falling into a state unable to skip in the exploration process, the maximum step number (the 5$^{th}$ line) of the action sequence is set, and when the step number reaches

8 executed according to policy, and the AUT responds to the action and converts the action into another state (the 6-8$^{th}$ lines). If the AUT is converted into a fault state, the current action sequence is added into a fault case set, and the round of test (the 9-11$^{th}$ lines) is finished; otherwise, the pre-processing module abstracts a next state $s_{t+1}$ and an action set $A_{t+1}$ (the 12$^{th}$ line). Within the given time budget, the AndroidExplore has not explored a new state, the DFA constructed during operation provides advanced guidance to select the most curious state as a starting point of next exploration, and update the action sequence (13-17$^{th}$ lines).

When the state $s_{t+1}$ is reached, the AndroidExplore compares the state $s_{t+1}$ with the explored states in the historical state set M according to the Android app state similarity calculation method, and calculates the reward $r_t$ according to their similarity values and updates the state set M (the 18-22$^{th}$ line). Then, the AndroidExplore trains the policy $\pi$ according to conversion information ($s_t$, $a_t$, $s_{t+1}$) and $r_t$ (the 23$^{rd}$ line, shown in formula 5). In addition, to improve the test efficiency, the DFA (the 24$^{th}$ line) is constructed dynamically according to conversion information ($s_t$, $a_t$, $s_{t+1}$) during operation, and the access number of times (the 25$^{th}$ line) of each conversion is updated. Finally, after the test is finished, the AUT is analyzed to generate the code coverage rate of the exploration (the 27$^{th}$ line).

Algorithm 1
AndroidExplore

```
Input:   the app under test AUT , testing time T , the length of episode L,
similarity threshold threshold
   Output:   The set of failed test cases F , the ratio of code coverage P
   Initialize:   policy π , M = Ø , F = Ø , traj = Ø , DFA D = Ø ,execution
time t = 0,N(s, a, s') = Ø
    1:   While ¬ timeout (T) do
    2:      reset(AUT)
    3:      s_t, A_t ← preprocessing (AUT, M)
    4:      M ← M ∪ s_t
    5:      for each t ∈ [1, L] do
    6:          a_t ← getAction (π, s_t)
    7:          traj ← traj.append(s_t,a_t)
    8:          failed ← execute (AUT, a_t)
    9:          if failed then
   10:          F ← F ∪ traj
   11:              break
   12:          s_{t+1}, A_{t+1} ← preprocessing (AUT, M)
   13:          if no curious state within some time then
   14:              acts ← selectTrajFromDFA(D)▷ shown in Algorithm
3
   15:              update t with the action sequence acts
   16:          s_t ← reset(AUT, acts)
   17:              continue
   18:          for s in M do
   19:              similarity ← max(sim (s_{t+1}, S))▷
   20:              if similarity < thresholdthen
   21:          M ← M ∪ s_{t+1}
   22:              r_t ← R (s_{t+1})
   23:              train policy π using (s_t, a_t, s_{t+1}, r_t)▷ Q-learning
   24:              update DFA D using transition (s_t, a_t, s_{t+1})
   25:              update N(s, a, s') using transition (s_t, a_t, s_{t+1})
   26:          s_t = s_{t+1}
   27:   P ← getCoverageRadio(AUT)
``` the maximum, the app is rebooted to start a new round of test. After the test is started, the AndroidExplore maintains a state set M to store explored states (the 4$^{th}$ line), and hereby, the AndroidExplore is guided to explore some different states, i.e., the curious state. The pre-processing model abstracts an initial app state $s_t$ and an executable action set $A_t$ (the 3$^{rd}$ line) from the AUT. Each round of test is started in the initial state $s_t$, an action $a_t$ is selected and I, Pre-Processing To achieve Android app automatic testing guided by reinforcement learning, it is needed to further abstract the state of the Android app. An intuitive state represents a screen image (i.e., a screen capture) of the Android app. However, due to the dynamic nature of the Android app, this representing method may result in explosion of the number of the Android states. For example, the screen image may different due to different operations of the user (for example, in a form filling page, the user fills different form values). Therefore, use of the screen image as the state of the Android app may result in explosion of the number of the states, which is harmful to exploring reinforcement learning. It is found by further studies in the present invention that the Android app pages focusing on the same service logic often have a similar interface structure. Thus, the present invention abstracts the Android app states based on the interface structure of the Android app. Specifically speaking, an interface structure of a current Android app is analyzed using the automatic framework UIAutomator to acquire Activity and information of various view components, so as to abstract the Android app state $s_t=(act, e_1, e_2, \ldots, e_n)$, wherein act represents the Activity of a current Android App interface, $e_i=\{path_i, classname_i, x_i, y_i, width_i, height_i\}$ represents the view components in the interface, the view components being arranged in a tree structure, wherein $path_i$ represents a path of an element $e_i$ in the Android interface structure, $classname_i$ represents a class name of $e_i$, $x_i$ represents a horizontal ordinate of $e_i$ in the interface, $y_i$ represents a longitudinal ordinate of $e_i$ in the interface, $width_i$ represents a width of $e_i$ in the interface, and $height_i$ represents a height of $e_i$ in the interface.

For further description, the algorithm 2 shows a detailed process of pre-processing. Pre-processing takes the AUT as the input and outputs the current state $s_t$ and the action set $A_t$. During the test, the AndroidExplore maintains a state set M to store the states which have been accessed. First, the pre-processing acquires the current Android interface structure using the automatic framework (UIAutomator), analyzes Activity and information of various view controls contained therein, and generates the state $s_t$ according to the information (the first to second lines). Then, the Pre-processing traverses and analyzes the attribute (e.g., clickable, scrollable) of each view control to infer and generate an executable action set (the $3^{rd}$ line). In addition, the system level events (for example, screen rotation, volume increase and decrease, and the like) of the mobile equipment are added into the action set to expose more app faults (the $4^{th}$ line). Finally, to prevent the number of the states from being excessive, the present invention compares the current state with the accessed states using the Android app state similarity calculation method. If the similarity is greater than the set threshold, the states are merged, and otherwise, the new state $s_t$ is returned (the 5-9$^{th}$ lines).

---

Algorithm 2
preprocessing

---

Input: the app under test AUT , the accessed state set M
Output: The current state $s_t$, the valid action set in the current state $A_t$
1: act, pageInfo ← device.dump (AUT)
2: create new state $s_t$ using < act, pageInfo >
3:  $A_t$ ← analysisActions(AUT)
4: add app system event to $A_t$
5: for s in M do
6: similarity=sim (s$_t$, s)
7:   if similarity > threshold then
8:     return s, $A_t$
9: return $s_t$, $A_t$

---

II, Low Level Guidance of Reinforcement Learning

The AndroidExplore is directly interacted with the Android app using reinforcement learning to achieve the automatic testing. Specifically speaking, in the Android app test, the goal is to learn an effective exploration policy to generate high quality test cases. The test cases are executed to explore different behaviors of the App, so that the probability that faults hidden in the app are found is further improved. To achieve such a policy, it is needed to further define an effective reward function in the present invention.
(1) Reward Function Usually speaking, a common RL task has a clearly quantizable optimization goal (for example, maximize or minimize the target function), which can be taken as a design ground for the reward function. However, in the Android app test, as the goal of the Android app test is to explore different behaviors in the Android app as far as possible, the goal is fuzzy, resulting in difficulty to design the reward function. Therefore, it is found by further studies in the present invention that the Android app pages focusing on the different behaviors often have different interface structures (i.e., states). Therefore, the present invention provides an Android app state similarity calculation method and integrates it into design of the reward function based on the curiosity thought, so as to hereby guide the Android app test to advance toward a direction of finding more different states. In this section, the present invention will introduce the mentioned Android app state similarity calculation method and how to integrate it into the design of the reward function.

(1.1) Android app state similarity calculation method: the present invention further provides an Android app state similarity calculation method based on the state definition. Specifically speaking, two Android app states $RT_k$ and $RT_j$ are given; first, whether the Activities where the two Android app states belong are same is judged, if not, the two Android app states may focus on different functional scenarios, and the two Android app states are regarded as different states; otherwise, an interface similarity of the two Android app states are further calculated based on interface structure information, as shown in equation 1, and if the interface similarity is greater than a predefined threshold, the two Android app states are regarded as the same states, and the similarity threshold in the present invention is set as 0.9.

$$sim(RT_k, RT_j) = \frac{\sum_{l=1}^{N} \sum_{q=1}^{M_i} \sum_{r=1}^{M_j} equalE(e_{k,l,q}, e_{j,l,r})}{\max(N(RT_k), N(RT_j))}, \tag{1}$$

wherein l represents the number of layers where the element is located, $e_{k,l,q}$ represents the $q^{th}$ element in the l$^{th}$ layer in $RT_k$, and $e_{j,l,r}$ represents the $r^{th}$ element of a node in the l$^{th}$ layer in $RT_j$; a function equalE( ) is used to judge whether the two elements are same; the number of same elements between $RT_k$ and $RT_j$ are calculated layer by layer, the l$^{th}$ layer of $RT_j$ is traversed to judge whether an $e_{j,l,r}$ is the same as an element $e_{k,l,q}$ in $RT_k$, if yes, equalE($e_{k,l,q}$, $e_{j,l,r}$)=1, indicating that there is the element same with $e_{j,l,r}$ in $RT_j$; then, the number of the same elements between $RT_k$ and $RT_j$ is divided by a greater value of the numbers of the elements to obtain the similarity between $RT_k$ and $RT_j$; and when the similarity is greater than the threshold, it is regarded that two interface states are same (equalRT). In the present invention, the threshold of the interface state similarity is set as 0.5 according to the using experience.

In the process of comparing the interface state similarity, it is needed to judge whether the two elements are same, with a judging rule as follows: first, whether the positions path and class names classname of the two elements in the interface structure are same is judged; then, whether appearances of the two elements are similar is judged, and the similarity calculation method is shown in an equation 2; and moreover, only when the positions and class names of the two elements are same in attribute and similar in appearance, the two elements are same;

$$sim(e_{k,l,q}, e_{j,l,r}) = \frac{\min(e_{k,l,q} \cdot x, e_{j,l,r} \cdot x)}{\max(e_{k,l,q} \cdot x, e_{j,l,r} \cdot x)} * p_1 + \tag{2}$$

$$\frac{\min(e_{k,l,q} \cdot y, e_{j,l,r} \cdot y)}{\max(e_{k,l,q} \cdot y, e_{j,l,r} \cdot y)} * p_2 + \frac{\min(e_{k,l,q} \cdot width, e_{j,l,r} \cdot width)}{\max(e_{k,l,q}width, e_{j,l,r} \cdot width)} * p_3 +$$

$$\frac{\min(e_{k,l,q} \cdot height, e_{j,l,r} \cdot height)}{\max(e_{k,l,q}height, e_{j,l,r} \cdot height)} * p_4,$$

Equation 2 represents the similarity calculation method of element appearance. The equation is a weighted sum of four portions. In the four portions, the similarity levels of horizontal ordinates, longitudinal ordinates, widths, and heights of the elements $e_{k,l,g}$ and $e_{j,l,r}$ are respectively calculated. $p_i$ is their weight, and is set empirically. In the present invention, $p_1$, $p_2$, $p_3$, $p_4$ is 0.25. When the similarity sim is greater than the threshold, it is regarded that two elements are same. In the present invention, the threshold of the element similarity is set as 0.6 according to the using experience.

Reward Function (1.2) Design of the reward function: based on the Android app state similarity calculation method, the present invention provides a curiosity-driven reward function. Specifically speaking, during the test, the AndroidExplore maintains a state set M to record the states which have been reached. when a state $s_t$ is reached, if the Activity of the state $s_t$ is different from the Activity of all the accessed states or $s_t$ is a fault state, it is regarded in the present invention that the state is a brand new state, and a big reward of 100 is given; otherwise, the reward is given according to the state $s_t$ and the maximum similarity of the accessed states (with same Activity with $s_t$) in the set M, wherein a basic thought thereof lies in that the higher the similarity value is, the smaller the acquired reward is; when the similarity is greater than the set threshold, it is regarded in the present invention that the state $s_t$ has been accessed with a lower exploration value, and a reward of −100 is given; and the curiosity-driven record function is shown in an equation 3:

$$R(s_t) = \begin{cases} 100 & g(s_t) \notin g(M) \text{ or crash} \\ 100 \cdot (1 - h(s_t)) & g(s_t) \in g(M) \text{ and } h(s_t) \leq 0.9 \\ -100 & g(s_t) \in g(M) \text{ and } h(s_t) > 0.9 \end{cases} \tag{3}$$

wherein $s_t$ is the current state, M is the historical state set, a g(s) function represents the Activity of the state s, crash represents an app breakdown state, and $$h(s) = \max_{\substack{t \in M \\ g(t)=g(s)}} sim(s, t)$$

is the maximum similarity of the state s and the accessed state in the set M.

(2) Q-Learning Training

The AndroidExplore is directly interacted with the Android app using a model-free reinforcement learning method Q-learning to learn an effective exploration policy for guiding to preferably explore more valuable states in the reinforcement learning and Android app interaction processes, so as to achieve the high quality and high efficiency Android app automatic testing. In this section, the training process of the Q-learning exploration policy and the Android app test process based on the exploration policy will be further illustrated. It is worth emphasizing that in the method provided by the present invention, the policy training process is the Android app testing process.

The AndroidExplore synchronously optimizes the exploration policy of reinforcement learning in the Android app testing process based on the curiosity-driven reward function designed in the previous section, with a specific optimization process as follows:

first, Q-learning maintains a Q function (as shown in the equation 4), and the Q function returns a corresponding Q value for any state-action pair. As the states and actions all are discrete in the Android app test, the Q function can represent the Q values of the state-action pairs in form of tables (Q table).

Then, in each discrete time step t, the Android app executes an action $a_t$ in a state $s_t$ and converts the state into a state $s_{t+1}$. The method provided by the present invention calculates the reward value $r_t$ of the action $a_t$ using the curiosity-driven function according to conversion information $(s_t, a_t, s_{t+1})$.

Finally, the method provided by the present invention calculates the acquired reward value $r_t$ according to the conversion information $(s_t, a_t, s_{t+1})$ and the reward function, and updates the Q function (i.e., the Q table) using an equation 5, so as to train the exploration policy $\pi$ of reinforcement learning;

$$Q(s_t, a_t) \leftarrow Q(s_t, a_t) + \alpha(r_t + \gamma Q^*(s_{t+1}, a_{t+1}) - Q(s_t, a_t)); \tag{4}$$

In the Android app test, the reinforcement learning is constantly interacted with the Android app based on the exploration policy to achieve the Android app automatic testing. Specifically speaking, when the Android app reaches the state $s_{t+1}$, based on the Q function of Q-learning, the reinforcement learning selects a next valid action $a_{t+1}$ in the state $s_{t+1}$ using a greedy policy of $\epsilon$-greedy, and a selection policy of a specific action is shown in an equation 5, wherein the specific meaning of the equation 5 is as follows: the reinforcement learning selects the action with the maximum Q value with the probability of $1-\epsilon$ according to the Q function (i.e., Q form), and randomly selects a user interface (UI) event or a system-level event of the mobile equipment in the state $s_{t+1}$ with the probability of $\epsilon/2$;

$$\tag{5}$$

$$getAction(s) =$$

$$\begin{cases} \underset{a}{\arg\max} Q(s, a) & 1 - \varepsilon \\ \text{Randomly select an } UI \text{ event} & \frac{1}{2}\varepsilon \\ \text{Randomly select a system event of the mobile equipment} & \frac{1}{2}\varepsilon \end{cases};$$

therefore, in the reinforcement learning guided Android app automatic testing, a higher curiosity reward will be given to an action finding the new state, which is capable of improving the probability that the new state is accessed, so that more different states can be tested. In addition, the method provided by the present invention further integrates the Android app state similarity into the design of the reward function. The higher the similarity of a state with the accessed state is, the lower the exploration value is, so is the curiosity reward. Thus, more valuable states are preferably explored in the Android app test. At the same time, as the curiosity of the action will decrease with execution of the action, other actions with a small execution number of times are highly probably executed. It is beneficial to not only fully exploring the Android app in the test, but also finding more complicated service logics in the Android app.

III, High-Level Guidance of DFA

Exploration is widely regarded as one of the most challenging problems in the reinforcement learning. During the Android app test, the reinforcement learning may fall into local optimum, i.e., the reinforcement learning may fall into cyclic conversion of definite Android app states, and other new states are hardly found, so that different behaviors of the Android app cannot be fully explored. Besides, in the Android app, to trigger some functions, it is usually needed to execute, by the user, a series of actions according to a specific sequence, for example, it is needed to click, by the user, session reservation and then select session type for the session reservation function of audio and video session software, then to fill session information (such as session topic and session time), and to finally click confirm to accomplish session reservation. These actions have a sequential relationship. With elongation of the action sequence, exploration becomes more challenging. Although the curiosity-driven reward function is capable of guiding the reinforcement learning to preferably explore more valuable states, as the reinforcement learning is still random, it still has a certain probability to randomly select other actions in these long action sequences, which results in interruption of target functions behind the action sequence. As shown in the example in FIG. 2, in the Android app test, each step of the reinforcement learning policy selects a correct action (red arrow) with the probability of 0.9 to reach the state $s_{m+1}$. However, as each step still has the probability of 0.1 to select other actions to cause interruption of the target path, the probability of reaching the state $s_{m+1}$ is only $(0.9)^5=0.53$. It can be found that the longer the path reaching the target state is, the higher the probability of interruption of the path is, and the smaller the probability of reaching the state is, so that it is hard to achieve ideal path conversion.

To cope with this challenge, the AndroidExplore dynamically and incrementally constructs a DFA during the Android app test, which provides high-level guidance for further improving the testing efficiency and quality. Specifically speaking, the AndroidExplore dynamically constructs a DFA dynamically according to the conversion $(s_t, a_t, s_{t+1})$ during the test. During the test, if a new state has not been found within the given time budget, a conversion with the highest curiosity is selected from the DFA based on the curiosity thought.

During the Android app test, the AndroidExplore records the number of times of each conversion (defined as N(s, a, s')). A conversion $(s_t, a_t, s_{t+1})$ is executed, so the DFA and N(s, a, s') will be updated, i.e., $\delta=\delta\cup\{((s_t, a_t, s_{t+1})\}$ and N($s_t$, $a_t$, $s_{t+1}$)=N($s_t$, $a_t$, $s_{t+1}$)+1. During the test, if the new state has not been found within the given time budget, the RL selects a conversion with the highest curiosity from the DFA based on the curiosity thought. An algorithm 3 describes how the AndroidExplore selects the conversion of the state with the highest curiosity based on the DFA in detail. By taking the DFA construction during operation and the set N(s, a, s') recording the number of times of conversion of the state as input, it outputs the path of the conversion with the highest curiosity. First, a state conversion $(s_k, a_k, s_{k+1})$ with the smallest number of execution is selected according to the set N(s, a, s') (the first line). Then, the DFA is traversed according to the shortest path algorithm to search for the shortest path tr capable of reaching the conversion (the $2^{nd}$ line). Finally, the shortest path tr (the $3^{rd}$-$4^{th}$ lines) is returned.

Therefore, the present invention can effectively cope with problems in the reinforcement learning exploration process. When the RL falls into the cyclic conversion of definite states in the exploration process, the new state cannot be found within the given time budget, so a conversion is selected according to the DFA, and the Android app is reset to the conversion for continuous exploration. It not only can help the RL to skip out of the inter-state cycle, but also can improve the exploration probability of the conversions which can be accessed with very long action sequence. Due to small number of times of access of the conversions, the curiosity degree is high, and they can be preferably selected.

| Algorithm 3 selectTrajFromDFA |
| --- |
| Input: the DFA D, conversion record table N(s, a, s') |
| Output: the valid action set tr |
| 1: $(s_k, a_k, s_{k+1}) = \min\limits_{(s_i,a_i,s_{i+1})\in\delta} N(s_i, a_i, s_{i+1})$ |
| 2: Find an trace traj to the transition($S_k$, $a_k$, $S_{k+1}$) from DFA |
| 3: tr = ($s_0$, $a_0$, $s_1$, $a_1$, . . . , $s_k$, $a_k$, $s_{k+1}$) |
| 4: return tr |

Theoretically, the nondeterministic DFA can represent the dynamic nature of a random environment more accurately. However, the DFA is used in the present invention for the following reasons: (1) the DFA is used for guiding to select a feasible exploration path for test; due to dynamic factors (such as network), one path in the DFA may be infeasible; as dynamic execution will neglect these infeasible paths, it will not affect the reliability of the method provided by the present invention; and (2) it may be quite tedious to construct the nondeterministic DFA, especially in terms of transition probability. To balance the efficiency constructed by the DFA and the particle size, the DFA is an effective optimization method for the Android app automatic testing.

IV, Experimental Estimation

Aiming at Android app automatic testing, the present invention proposes a curiosity-driven Android app automatic testing method. The present invention is experimented on a real Android app, so the validness of the method provided by the present invention is verified, and the present invention is further estimated in the following five research problems:

Research problem 1: compared with a baseline method, how capable of the method provided by the present invention is in terms of code coverage?

Research problem 2: compared with the baseline method, how about the validness of the method provided by the present invention is in terms of detecting faults of the Android app?

Research problem 3: compared with the baseline method, how much the method provided by the present invention is increased in terms of testing efficiency?

Experiment Settings

In large-scaled evaluation of the present invention, by using a research basis including 20 Android apps in the real world, the method provided by the present invention is compared with the most advanced Android app testing technique on the research basis.

In a large-scaled experimental process, to study the validness of the method provided by the method and the current method in detecting the faults of the Android app, the present invention further collects system-level app faults reported in a control console. It is worth noting that the user-level app faults do not necessarily cause system-level faults, which is dependent on the robustness of the Android app. For example, the Android app features strict input field examination, which prevents collapse of the Android app due to illegal input, thus, avoiding the system-level app faults. The user-level faults do not affect overall operation of the Android app and cause collapse of the Android app. In addition, different Android apps may have different definitions for the user-level faults, which are hardly differentiated. Therefore, the present invention mainly collects the system-level faults reported in the control console, which may cause collapse or abnormal operation of the app. It is worth emphasizing that all faults found by the present invention are further manually examined and confirmed to ensure that the casted abnormalities and errors are actually faults.

To evaluate the validness of the method provided by the present invention on Android app automatic testing, the present invention selects three advanced Android app automatic testing methods as the baseline methods for comparative researches. The three baseline methods are respectively as follows: a random policy-based automatic testing method (Monkey), a model policy-based automatic testing method (Stoat), and a reinforcement learning-based automatic testing method (Q-testing), which are issued in the international top academic conference International Symposium on Software Testing and Analysis (ISSTA) in the field of software testing. The specific methods are introduced as follows:

(1) The random policy-based Monkey is randomly reacted with screen ordinates of the Android app to generate a pseudo-random flow of a user interaction event.

(2) The model policy-based Stoat is a method based on construction of an Android app model.

(3) The reinforcement learning-based Q-testing explores the tested Android app based on the curiosity thought.

To test 20 Android apps, the same testing method is set as 60 min for each automatic testing method in the present invention. To avoid a long page loading time after some complicated actions are executed, a waiting time of 2 s is set after each action is executed in the present invention to ensure that the page is loaded successfully. According to the experimental settings of previous work, the default times of two stages of the Stoat method are set as 30 min. In terms of parameter setting, the state similarity threshold used in the pre-processing module in the present invention is set as 0.9. The discount factor coefficient $\gamma$ in the reinforcement learning in the present invention is set as 0.96. The action selection in the reinforcement learning in the present invention uses a $\epsilon$-greedy policy, and $\epsilon$=0.2 is set in the present invention. The time budget of the DFA providing high-level guidance is 2 min, i.e., the reinforcement learning within two minutes has not found the new state, so the DFA provides layered guidance. Besides, during the Android app testing, by analyzing the packet name of the Android app, the present invention records the actions causing external links and marks them as invalid actions. These actions will not be executed in subsequent tests. To maintain the consistency, the prevent invention calculates the code coverage rate after the Android app testing using Jacoco.

Experimental Results

Code Coverage Rate

The present invention compares the code coverage rates of the AndroidExplore and the methods (Monkey, Stoat and Q-testing) proposed in previous work in the selected 20 real Android apps. Table 1 shows the average instruction coverage rates of the Monkey, Stoat, Q-testing, and the AndroidExplore tested on 20 open source apps, wherein the bold number represents the optimum result. Generally speaking, the method provided by the present invention gains the optimum code coverage rate result on the 16/20 Android apps, and then Q-testing gains the optimum result on 3/20 Android apps.

Specifically speaking, Monkey is based on a random thought, and is short of guidance by the exploration policy in the testing process, which results in constant execution of repeated actions. The test is largely random, so the overall code coverage rate is low. Stoat relies on the app model constructed in the first stage. If the real app is complicated, the constructed app model cannot fully cover all behaviors of the actual app, so there is still boundedness in testing. Q-testing proposes curiosity-driven reinforcement learning to guide the Android app automatic testing. It also takes the state similarity as the basis for giving reward to the action, i.e., the similarity between the found state and the accessed states is greater than the threshold value, so a reward of −500 is given to the corresponding action, and otherwise, a reward of 500 is given, which may guide the test to find more different states. However, the reward function has boundedness. Compared with Q-testing, the method provided by the present invention designs the more elaborated reward function as guidance and integrates the actual state similarity into the reward function, which can measure the actual exploration value of each state more accurately. For example, the similarity of two states and the accessed states is respectively 0.9 and 0.95. In Q-testing, the actions will be given the reward of −500. In the method, the action with the state similarity of 0.9 will be given a higher reward because the state is much different with higher exploration value. Second, it is found in the present invention that many pages need complicated input and correct operation sequences in the app. For example, in a form submitting page, it is needed to fill a lot of form values to execute submission. In the method provided by the present invention, the template-based input is set, so testing of the functions can be triggered fast.

| App name | ELOC | Mon-key | Stoa | Q-testing | Method provided by the present invention |
|---|---|---|---|---|---|
| Keepassdroid | 37701 | 11 | 12 | 9 | 33 |
| Sketches | 6248 | 20 | 24 | 33 | 39 |
| uhabits | 42146 | 49 | 48 | 49 | 57 |
| weather | 4541 | 53 | 48 | 64 | 68 |

-continued

| App name | ELOC | Mon-key | Stoa | Q-testing | Method provided by the present invention |
|---|---|---|---|---|---|
| simplenote | 9527 | 23 | 29 | 34 | 32 |
| tally | 6697 | 49 | 59 | 75 | 72 |
| Countday | 2708 | 50 | 37 | 55 | 60 |
| Word | 4610 | 66 | 64 | 70 | 72 |
| Text | 1291 | 42 | 36 | 66 | 78 |
| Calendar | 6384 | 49 | 64 | 61 | 62 |
| rubbish | 3435 | 15 | 18 | 21 | 28 |
| alarm | 409 | 47 | 33 | 45 | 43 |
| anycut | 1918 | 36 | 52 | 55 | 63 |
| monitor | 1523 | 6 | 6 | 9 | 9 |
| passwordMaker | 1653 | 75 | 86 | 87 | 92 |
| soundboard | 3209 | 31 | 39 | 43 | 48 |
| multismssender | 4614 | 31 | 29 | 40 | 46 |
| smss | 1442 | 58 | 63 | 66 | 79 |
| budgetwatch | 1349 | 66 | 74 | 71 | 83 |
| fillup | 11163 | 28 | 25 | 31 | 38 |

4.5.2.2 Error Exposure Number

In the experiment in the section, aiming at the research problem 2, the Android app faults found in the method provided by the present invention and the methods (Monkey, Stoat, and Q-testing) mentioned in the previous work are counted and compared in 20 real Android apps. Within the given 60-min testing time, the numbers of the Android app faults found by the four methods: Monkey, Stoat, and Q-testing, and the method provided by the present invention are shown, wherein the bold number represents the optimum result. Generally speaking, the method provided by the present invention finds more Android app faults, totally 32 android app faults.

Finally, the present invention analyzes the found Android app faults deeply to further uncover why the method provided by the method can find more Android app faults than other baseline methods. Specifically speaking, some faults can be found by executing the very long action sequence. As the action in each step is randomly selected, other baseline methods can hardly trigger the faults. However, during operation, the DFA is constructed to provide advanced guidance for app testing. If the new state cannot be found within the given time budget, the app will be reset to a conversion with the smallest number of access selected by the DFA for continuous exploration. It can improve the exploration probability of the conversions which can be accessed with the very long action sequence.

What is claimed is:

1. A curiosity-driven Android app automatic testing method, comprising following steps:

1) a left part representing a pre-processing assembly for achieving abstraction of an Android app state based on an Android interface structure, wherein the pre-processing assembly extracts the Android interface structure using an automatic framework UIautomator, maps the Android interface structure into the Android app state, and extracts an executable event set;

2) a right part being a curiosity-driven reinforcement learning module for maintaining a historical access state set and optimizing an exploration policy constantly to guide a test to find more new states under a guidance of a reward function based on a curiosity thought; and 3) a middle part representing an advanced guidance module of a deterministic finite automaton (DFA), wherein the DFA is constructed during operation of the advanced guidance module of the DFA to record all access states and frequencies thereof; and if the new states are not explored within a given time budget, an AndroidExplore selects the most curious state as a starting point of a next exploration according to global information of the DFA, so as to prevent from falling into a local optimum and improve an exploration probability of a deep function;

wherein an Android app under test (AUT), a testing time, a maximum step number of an action sequence and a similarity threshold are taken as inputs; then, the Android AUT is constantly explored within a given testing time, the maximum step number of the action sequence is set, and when the step number is the maximum, the AUT is rebooted to start a new round of the test; after the test is started, the AndroidExplore maintains a historical state set M to store an explored state and is hereby guided to explore some different states, wherein, curious states; a pre-processing module abstracts an initial Android app state $s_t$ and an executable action set At from the AUT; each round of the test is started in the initial Andriod app state $s_t$, an action at is selected and executed according to a policy, and the AUT responds to the action and converts the action into another state; if the AUT is converted into a fault state, a current action sequence is added into a fault case set, and this round of the test is finished; otherwise, the pre-processing module abstracts a next state $s_{t+1}$ and an action set $A_{t+1}$; and if within the given time budget, the AndroidExplore has not explored the new states, the DFA constructed during the operation provides advanced guidance, selects the most curious state as the starting point of the next exploration, and updates the action sequence; and when the next state $s_{t+1}$ is reached, the AndroidExplore compares the next state $s_{t+1}$ with the explored state in the historical state set M according to an Android app state similarity calculation method, and calculates a reward $r_t$ according to similarity values thereof and updates the historical state set M; then, the AndroidExplore trains a policy $\pi$ according to conversion information $(s_t, a_t, s_{t+1})$ and the reward $r_t$; in addition, during the operation, the DFA is dynamically constructed according to the conversion information $(s_t, a_t, s_{t+1})$ during the operation, and an access number of times of each conversion is updated; and finally, after the test is finished, the AUT is analyzed to generate a code coverage rate of this exploration;

wherein the interface structure of a current Android app is analyzed using the automatic framework UIAutomator to acquire Activity and information of various view components, so as to abstract the initial Android app state $s_t=(act, e_1, e_2, \ldots, e_n)$, wherein act represents the Activity of a current Android App interface, $e_i=\{path_i, classname_i, x_i, y_i, width_i, height_i\}$ represents the view components in the interface, the view components being arranged in a tree structure, wherein $path_i$ represents a path of an element e; in the Android interface structure, $classname_i$ represents a class name of $e_1$, $x_i$ represents a horizontal ordinate of $e_i$ in the interface, $y_i$ represents a longitudinal ordinate of e; in the interface, $width_i$ represents a width of $e_i$ in the interface, and $height_i$ represents a height of $e_i$ in the interface; and the pre-processing module takes the AUT as an input and outputs the current state and an action set $A_i$; during the test, the AndroidExplore maintains the historical state set M to store an accessed state; first, the pre-processing module acquires the current Android interface structure using the automatic framework UIAutomator, analyzes the Activity and the information of various view components comprised in the current Android interface structure, and generates the current state according to the information of various view components; then, the pre-processing module traverses and analyzes attributes (e.g., clickable, scrollable) of each view component to infer and generate the executable action set $A_t$; in addition, a system-level event of mobile equipment is added into the executable action set $A_t$ to expose more app faults; and finally, the current state is compared with the accessed states by adopting the Android app state similarity calculation method, and if the similarity is greater than a set threshold, the states are merged, and otherwise, the state is returned in form of a new state;

wherein the AndroidExplore dynamically and incrementally constructs the DFA during the Android app test; the AndroidExplore dynamically constructs the DFA according to the conversion information ($s_t$, $a_t$, $s_{t+1}$) during the test first; and during the test, if there are no new states found within the given time budget, a conversion with highest curiosity is selected from the DFA based on the curiosity thought;

during the Android app test, the AndroidExplore records a number of times of each conversion, defined as N(s, a, s'); one conversion ($s_t$, $a_t$, $s_{t+1}$) is executed, so the DFA and N(s, a, s') are also updated, i.e., $\delta=\delta U\{((s_t, a_t, s_{t+1})\}$ and N($s_t$, $a_t$, $s_{t+1}$)=N($s_t$, $a_t$, $s_{t+1}$)+1; and during the test, if an Reinforcement Learninq (RL) has not found the state within the given time budget, the RL selects a conversion of the conversion information ($s_t$, $a_t$, $s_{t+1}$ with the highest curiosity from the DFA based on the curiosity thought; and by taking the DFA constructed during the operation and a set N(s, a, s') recording the number of conversions of a number of state transitions as inputs, a path capable of reaching the conversion with the highest curiosity is outputted; first, a state conversion ($s_k$, $a_k$, $s_{k+1}$) with the least executing number of times is selected according to the set N(s, a, s'), then, the DFA is traversed according to a shortest path algorithm to seek for a shortest path tr capable of reaching the conversion; and finally, the shortest path tr is returned.

2. The curiosity-driven Android app automatic testing method according to claim 1, wherein in the Android app test, a target is to learn an effective exploration policy to generate high quality test cases.

3. The curiosity-driven Android app automatic testing method according to claim 2, wherein the Android app state similarity calculation method is proposed and integrated into design of the effective reward function based on the curiosity thought, so as to hereby guide the Android app test to advance toward a direction of finding more different states.

4. The curiosity-driven Android App automatic testing method according to claim 3, wherein two Android app states $RT_k$ and $RT_j$ are given; first, whether Activities where the two Android app states belong are same is judged, if not, the two Android app states focus on different functional scenarios, and the two Android app states are regarded as different states; otherwise, an interface similarity of the two Android app states are further calculated based on interface structure information, as shown in equation 1, and if the interface similarity is greater than a predefined threshold, the two Android app states are regarded as the same states;

$$sim(RT_k, RT_j) = \frac{\sum_{l=1}^{N}\sum_{q=1}^{M_i}\sum_{r=1}^{M_j} equalE(e_{k,l,q}, e_{j,l,r})}{\max(N(RT_k), N(RT_j))}, \tag{1}$$

wherein l represents the number of layers where the element is located, $e_{k,l,q}$ represents the $q^{th}$ element in the th layer in $RT_k$, and $e_{j,l,r}$ represents the $r^{th}$ element of a node in the $l^{th}$ layer in $RT_j$; a function equalE( ) is used to judge whether the two elements are same; the number of same elements between $RT_k$ and $RT_j$ are calculated layer by layer, the $l^{th}$ layer of $RT_j$ is traversed to judge whether an $e_{j,l,r}$ is the same as an element $e_{k,l,q}$ in $RT_k$, if yes, equalE($e_{k,l,q}$, $e_{j,l,r}$)=1, indicating that there is the element same with $e_{j,l,r}$ in $RT_j$; then, the number of the same elements between $RT_k$ and $RT_j$ is divided by a greater value of the numbers of the elements to obtain the similarity between $RT_k$ and $RT_j$; and when the similarity is greater than the predefined threshold, it is regarded that two interface states are same;

in a process of comparing the similarities of the interface states, it is needed to judge whether the two elements are same, with a judging rule as follows: first, whether positions path and class names classname of the two elements in the interface structure are same is judged; then, whether appearances of the two elements are similar are judged, and the similarity calculation method is shown in an equation 2; and moreover, only when the positions and class names of the two elements are same in attribute and similar in appearance, the two elements are same;

$$sim(e_{k,l,q}, e_{j,l,r}) = \frac{\min(e_{k,l,q} \cdot x, e_{j,l,r} \cdot x)}{\max(e_{k,l,q} \cdot x, e_{j,l,r} \cdot x)} * p_1 + \tag{2}$$

$$\frac{\min(e_{k,l,q} \cdot y, e_{j,l,r} \cdot y)}{\max(e_{k,l,q} \cdot y, e_{j,l,r} \cdot y)} * p_2 + \frac{\min(e_{k,l,q} \cdot width, e_{j,l,r} \cdot width)}{\max(e_{k,l,q} width, e_{j,l,r} \cdot width)} * p_3 +$$

$$\frac{\min(e_{k,l,q} \cdot height, e_{j,l,r} \cdot height)}{\max(e_{k,l,q} height, e_{j,l,r} \cdot height)} * p_4,$$

wherein the equation 2 represents the similarity calculation method of the appearances of the elements, and is a weighted sum of four parts; the four parts are respectively levels of similarity of horizontal ordinates, longitudinal ordinates, widths, and heights of the elements $e_{k,l,q}$ and $e_{j,l,r}$; $p_i$ is weights thereof; and when the similarity sim is greater than the threshold, it is regarded that the two elements are same.

5. The curiosity-driven Android app automatic testing method according to claim 3, wherein during test, the AndroidExplore maintains the historical state set M to record reached states; if Activity of the current state is different from Activity of all the accessed states, or the current state is a fault state, it is regarded that the state is a brand new state, and a big reward of 100 is given; otherwise, the reward $r_t$ is given according to the state $s_t$ and the maximum similarity of the accessed states in the historical set M, wherein a basic thought thereof lies in that the higher the similarity value is, the smaller the reward $r_t$ is; when the similarity is greater than a set threshold, it is regarded that the state $s_t$ has been accessed with a lower exploration value, and a reward of $-100$ is given; and a curiosity-driven record function is shown in an equation 3;

$$R(s_t) = \begin{cases} 100 & g(s_t) \notin g(M) \text{ or crash} \\ 100 \cdot (1 - h(s_t)) & g(s_t) \in g(M) \text{ and } h(s_t) \le 0.9 \\ -100 & g(s_t) \in g(M) \text{ and } h(s_t) > 0.9 \end{cases} \quad (3)$$

wherein $s_t$ is current state, M is the historical state set, a g(s) function represents the Activity of the state s, crash represents an app breakdown state, and $$h(s) = \max_{\substack{t \in M \\ g(t)=g(s)}} sim(s, t)$$

is the maximum similarity of the current state and the accessed state in the set M.

6. The curiosity-driven Android app automatic testing method according to claim 2, wherein the AndroidExplore synchronously optimizes the exploration policy of reinforcement learning in an Android app testing process based on the curiosity-driven reward function, with a specific optimization process as follows:

first, Q-learning maintains a Q function, and the Q function returns a corresponding Q value for any state-action pair; as the states and actions all are discrete in the Android app test, the Q function represents the Q values of the state-action pairs in form of tables;

then, in each discrete time step t, the Android app executes the action $a_t$ in a state $s_t$ and converts the state into a next state $s_{t+1}$; and the reward $r_t$ of the action $a_t$ is calculated using the curiosity-driven reward function according to the conversion information ($s_t$, $a_t$, $s_{t+1}$); and finally, the AndroidExplore calculates the reward $r_t$ according to the conversion information ($s_t$, $a_t$, $s_{t+1}$) and the reward function, and updates the Q function using an equation 4, so as to train the exploration policy $\pi$ of reinforcement learning;

$$Q(s_t, a_t) \leftarrow Q(s_t, a_t) + \alpha(r_t + \gamma Q^*(s_{t+1}, a_{t+1}) - Q(s_t, a_t)); \quad (4)$$

in the Android app test, the reinforcement learning is constantly interacted with the Android app based on the exploration policy, so as to implement an automatic test of the Android app; when the Android app reaches the next state $s_{t+1}$, based on the Q function of Q-learning, the reinforcement learning selects a next valid action $a_{t+1}$ in the state $s_{t+1}$ using a greedy policy of E-greedy, and a selection policy of a specific action is shown in an equation 5, wherein the specific meaning of the equation 5 is as follows: the reinforcement learning selects an action with the maximum Q value with the probability of 1-$\varepsilon$ according to the Q function, and randomly selects a user interface (UI) event or a system-level event of the mobile equipment in the state $s_{t+1}$ with the probability of $\varepsilon/2$;

$$(5)$$

$$getAction(s) = \begin{cases} \underset{a}{\operatorname{argmax}} Q(s, a) & 1 - \varepsilon \\ \text{Randomly select an } UI \text{ event} & \frac{1}{2}\varepsilon \\ \text{Randomly select a system event of the mobile equipment} & \frac{1}{2}\varepsilon \end{cases}$$

\* \* \* \* \*